(No Model.)

T. GASKINS.
DOUGH MIXER.

No. 504,873. Patented Sept. 12, 1893.

Witnesses:

Inventor
Thomas Gaskins
By James J Sheehy
Attorney

UNITED STATES PATENT OFFICE.

THOMAS GASKINS, OF ARCADIA, FLORIDA.

DOUGH-MIXER.

SPECIFICATION forming part of Letters Patent No. 504,873, dated September 12, 1893.

Application filed June 29, 1893. Serial No. 479,179. (No model.)

*To all whom it may concern:*

Be it known that I, THOMAS GASKINS, a citizen of the United States, residing at Arcadia, in the county of De Soto and State of Florida, have invented certain new and useful Improvements in Dough-Mixers; and I do declare the following to be a full, clear, and exact description of the invention, such as will enable others skilled in the art to which it appertains to make and use the same.

This invention has relation to an improvement in dough mixers or devices for mixing together the flour and other ingredients which form cakes and the like, and the novelty will be fully understood from the following description and claim when taken in connection with the accompanying drawings, in which—

Figure 1:
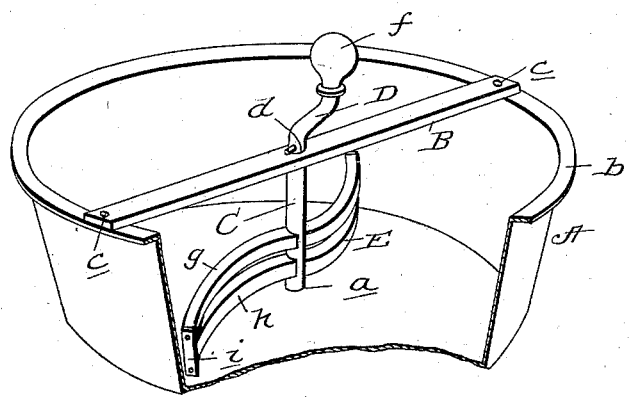
Figure 2:
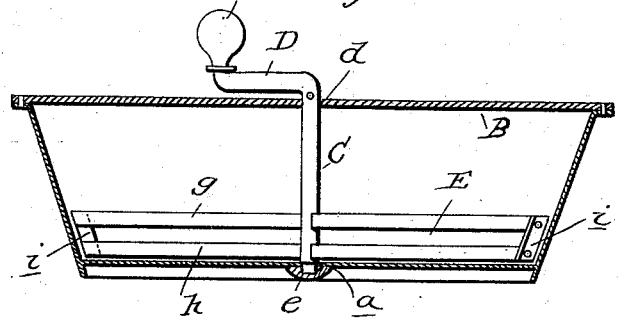

Figure 1, is a perspective view of my improved device with the body partly broken away to illustrate the interior, and Fig. 2, is a vertical, diametrical, sectional view of the same.

In carrying out my invention, I take a vessel A, which may be of sheet metal or other suitable material, and which may be of the general appearance of a pan, and provide it in its bottom with a central, vertical aperture $a$, and at its upper edge with an outwardly-directed, annular flange $b$. I then take a bar B, of metal or other suitable material of a sufficient length and width, and secure it at opposite ends to the flange $b$, as shown at $c$. This bar is disposed diametrically across the center of the vessel, and is provided with a vertical aperture $d$, at a point midway of its length, and directly above the aperture $a$, in the bottom of the vessel.

C, indicates the operating shaft, its lower end passing through the aperture $a$, in the bottom of the vessel, and a cap $e$, is secured to this lower end as shown, so as to prevent the leakage or discharge of any of the contents through the aperture. The upper end of this shaft terminates in a crank arm D, having a ball or hand grasp $f$.

E, indicates the agitator. This agitator which is secured to the operating shaft, and at a point close to the bottom of the vessel, comprises two beaters or blades $g$, and $h$; the beater $g$, being slightly greater in length than the beater $h$, so as to extend as near as possible to the side walls of the vessel which usually flare from the bottom, upwardly. These beaters have the configuration of compound curves. They are arranged parallel to each other, horizontally, and are secured midway of their length to the operating shaft, and are secured together at their outer ends by means of short plates $i$, and rivets or other suitable fastening devices.

From the foregoing description taken in connection with the accompanying drawings, the operation and advantages of my invention will be obvious. It will be seen that by simply placing the ingredients in the pan or vessel, and turning the crank handle, such ingredients will be thoroughly commingled by the beaters or agitator blades.

My device is very simple in construction, effective in operation, it may be manufactured at a very small expense, and there is nothing about it to get out of order.

Having described my invention, what I claim is—

The improved dough mixer described, consisting essentially of the vessel A, having the hole or aperture in the center of its bottom, the bar B, secured diametrically across the mouth of the vessel and having a hole coinciding with the hole in the bottom, the shaft passing through the respective holes, and having a cap or cover on its lower end beneath the vessel bottom, and having its opposite end terminating in a crank handle, and the beaters or blades formed from two parallel, compound curved strips secured midway of their length to the operating shaft, and secured together at their outer ends, the whole adapted to operate, substantially as specified.

In testimony whereof I affix my signature in presence of two witnesses.

THOMAS GASKINS.

Witnesses:
CHARLES E EARNEST, Jr.,
ALICE EARNEST.